US012544776B2

(12) United States Patent
Gehrung

(10) Patent No.: US 12,544,776 B2
(45) Date of Patent: Feb. 10, 2026

(54) PAINT CUP MADE OF NATURAL FIBROUS MATERIAL

(71) Applicant: SATA GmbH & Co. KG, Kornwestheim (DE)

(72) Inventor: Ralf Gehrung, Backnang (DE)

(73) Assignee: SATA GmbH & Co. KG, Kornwestheim (DE)

( * ) Notice: Subject to any disclaimer, the term of this patent is extended or adjusted under 35 U.S.C. 154(b) by 414 days.

(21) Appl. No.: 17/917,619

(22) PCT Filed: Apr. 7, 2021

(86) PCT No.: PCT/EP2021/059080
§ 371 (c)(1),
(2) Date: Oct. 7, 2022

(87) PCT Pub. No.: WO2021/204885
PCT Pub. Date: Oct. 14, 2021

(65) Prior Publication Data

US 2023/0173515 A1 Jun. 8, 2023

(30) Foreign Application Priority Data

Apr. 8, 2020 (DE) ..................... 10 2020 109 913.4

(51) Int. Cl.
*B05B 7/24* (2006.01)

(52) U.S. Cl.
CPC .......... *B05B 7/2408* (2013.01); *B05B 7/2478* (2013.01)

(58) Field of Classification Search
CPC ............................ B05B 7/2408; B05B 7/2478
USPC .......................................................... 239/302
See application file for complete search history.

(56) References Cited

U.S. PATENT DOCUMENTS

| | | | | |
|---|---|---|---|---|
| 2,595,317 | A | 5/1952 | White | |
| 3,270,920 | A | 9/1966 | Nessler | |
| 3,401,842 | A * | 9/1968 | Morrison | B05B 7/2481 220/300 |

(Continued)

FOREIGN PATENT DOCUMENTS

| | | | |
|---|---|---|---|
| BE | 1018968 | A3 | 12/2011 |
| CN | 300700565 | | 10/2007 |

(Continued)

OTHER PUBLICATIONS

JP7063814 Google Translated English (Year: 2017).*

(Continued)

*Primary Examiner* — Chee-Chong Lee
(74) *Attorney, Agent, or Firm* — Fleit Intellectual Property Law; Paul D. Bianco; Katharine Davis Wong

(57) ABSTRACT

A paint cup for a paint spray gun includes a paint container which has an opening and comprises a container wall and a lid which closes the opening. A coupling section of the container wall is arranged in a liquid-tight manner between a first and a second clamping surface of a lid system comprising the lid. The container wall is made of a natural fibrous material, in particular a cellulose-based fibrous material. In a method for sealingly closing such a paint cup, the coupling section is radially and/or axially clamped upon sealingly connecting the lid and the container wall made of natural fibrous material.

15 Claims, 7 Drawing Sheets

(56) References Cited

U.S. PATENT DOCUMENTS

| | | | | |
|---|---|---|---|---|
| 4,151,929 | A * | 5/1979 | Sapien | B05B 7/2408 220/373 |
| 4,270,668 | A * | 6/1981 | Berfield | B65D 45/18 292/87 |
| 4,388,997 | A * | 6/1983 | Grime | B05B 7/2408 220/203.14 |
| 4,430,084 | A * | 2/1984 | Deaton | A61M 1/00 206/520 |
| 5,582,350 | A | 12/1996 | Kosmyna | |
| 5,713,519 | A | 2/1998 | Sandison | |
| 5,797,520 | A | 8/1998 | Donahue | |
| 6,435,426 | B1 | 8/2002 | Copp | |
| D474,528 | S | 5/2003 | Huang | |
| 6,820,824 | B1 | 11/2004 | Joseph | |
| 6,877,677 | B2 | 4/2005 | Schmon | |
| 7,083,119 | B2 | 8/2006 | Bouic | |
| 7,175,110 | B2 | 2/2007 | Vicentini | |
| D574,926 | S | 8/2008 | Huang | |
| 7,416,140 | B2 | 8/2008 | Camilleri | |
| 7,568,638 | B2 | 8/2009 | Gehrung | |
| 7,614,571 | B2 | 11/2009 | Camilleri | |
| 7,694,896 | B2 | 4/2010 | Turnbull | |
| 7,798,427 | B2 | 9/2010 | Joseph | |
| 7,810,744 | B2 | 10/2010 | Schmon | |
| 7,819,341 | B2 | 10/2010 | Schmon | |
| 7,823,806 | B2 | 11/2010 | Schmon | |
| D644,803 | S | 9/2011 | Schmon | |
| 8,052,071 | B2 | 11/2011 | Kruse | |
| 8,297,536 | B2 | 10/2012 | Ruda | |
| 8,444,067 | B2 | 5/2013 | Schmon | |
| D689,590 | S | 9/2013 | Brose | |
| D692,530 | S | 10/2013 | Gehrung | |
| D692,532 | S | 10/2013 | Li | |
| 8,925,836 | B2 | 1/2015 | Dettlaff | |
| 9,259,960 | B1 | 2/2016 | Tepsi | |
| D758,533 | S | 6/2016 | Dettlaff | |
| 9,878,336 | B2 | 1/2018 | Gehrung | |
| D810,865 | S | 2/2018 | Hegdahl | |
| D815,248 | S | 4/2018 | Hegdahl | |
| 10,357,789 | B2 | 7/2019 | Camilleri | |
| 10,434,527 | B1 | 10/2019 | Smitshoek | |
| 10,471,450 | B2 | 11/2019 | Kruse | |
| D916,231 | S | 4/2021 | Xiao | |
| D916,232 | S | 4/2021 | Xiao | |
| D952,097 | S | 5/2022 | Kang | |
| D953,485 | S | 5/2022 | Xiao | |
| 2003/0006310 | A1 | 1/2003 | Rothrum | |
| 2005/0155968 | A1 | 7/2005 | Kosmyna | |
| 2005/0156058 | A1 | 7/2005 | Kosmyna | |
| 2006/0102550 | A1 | 5/2006 | Joseph | |
| 2006/0113409 | A1 | 6/2006 | Camilleri | |
| 2006/0196891 | A1 | 9/2006 | Gerson | |
| 2006/0283861 | A1 | 12/2006 | Kosmyna | |
| 2007/0018016 | A1 | 1/2007 | Yechouron | |
| 2007/0158349 | A1 | 7/2007 | Schmon | |
| 2007/0158462 | A1 | 7/2007 | Delbridge | |
| 2007/0221754 | A1 | 9/2007 | Gehrung | |
| 2007/0272323 | A1 | 11/2007 | Verhaeghe | |
| 2008/0011879 | A1 | 1/2008 | Gerson | |
| 2008/0179763 | A1 | 7/2008 | Schmon | |
| 2009/0014557 | A1 | 1/2009 | Schmon | |
| 2009/0072050 | A1 | 3/2009 | Ruda | |
| 2009/0108089 | A1 | 4/2009 | Handzel | |
| 2010/0288772 | A1 | 11/2010 | Wambeke | |
| 2011/0174901 | A1 | 7/2011 | Dettlaff | |
| 2012/0000992 | A1 | 1/2012 | Shih | |
| 2012/0043352 | A1 | 2/2012 | Rasmussen et al. | |
| 2012/0267388 | A1 | 10/2012 | Tom | |
| 2012/0273583 | A1 | 11/2012 | Gerson | |
| 2012/0280062 | A1 | 11/2012 | Pellegrino | |
| 2012/0291890 | A1 | 11/2012 | Pan | |
| 2013/0001317 | A1 | 1/2013 | Staunton | |
| 2014/0131380 | A1 | 5/2014 | Pethe | |
| 2014/0332532 | A1 | 11/2014 | Wang | |
| 2015/0108135 | A1 | 4/2015 | Hanna | |
| 2016/0052002 | A1 | 2/2016 | Schulz | |
| 2016/0303594 | A1* | 10/2016 | Nyaribo | B05B 7/2478 |
| 2017/0203887 | A1 | 7/2017 | Hegdahl | |
| 2017/0239679 | A1 | 8/2017 | Bierie | |
| 2018/0147586 | A1 | 5/2018 | Kruse | |
| 2018/0185869 | A1 | 7/2018 | Hegdahl | |
| 2019/0126300 | A1 | 5/2019 | Li | |
| 2020/0094276 | A1 | 3/2020 | Sun | |
| 2021/0078024 | A1 | 3/2021 | Hegdahl | |
| 2021/0197153 | A1 | 7/2021 | Schreiber | |
| 2022/0001406 | A1 | 1/2022 | Ruda | |
| 2022/0080435 | A1 | 3/2022 | Joseph | |
| 2023/0143762 | A1 | 5/2023 | Gehrung | |
| 2023/0271201 | A1 | 8/2023 | Dettlaff | |
| 2023/0271202 | A1 | 8/2023 | Dettlaff | |
| 2023/0278050 | A1 | 9/2023 | Dettlaff | |
| 2023/0286000 | A1 | 9/2023 | Dettlaff | |

FOREIGN PATENT DOCUMENTS

| | | | |
|---|---|---|---|
| CN | 101856639 | A | 10/2010 |
| CN | 201702089 | U | 1/2011 |
| CN | 302042040 | S | 8/2012 |
| CN | 204710607 | U | 10/2015 |
| CN | 207188095 | U | 4/2018 |
| CN | 108745690 | A | 11/2018 |
| CN | 208711972 | U | 4/2019 |
| CN | 208824797 | U | 5/2019 |
| CN | 110252563 | A | 9/2019 |
| CN | 209997827 | U | 1/2020 |
| CN | 209997846 | U | 1/2020 |
| CN | 111389608 | A | 7/2020 |
| CN | 212418369 | U | 1/2021 |
| CN | 212441781 | U | 2/2021 |
| CN | 306409970 | S | 3/2021 |
| CN | 212951930 | U | 4/2021 |
| CN | 213435249 | U | 6/2021 |
| CN | 306692658 | S | 7/2021 |
| CN | 213967319 | U | 8/2021 |
| CN | 214021611 | U | 8/2021 |
| CN | 214183647 | U | 9/2021 |
| CN | 214183730 | U | 9/2021 |
| CN | 214347419 | U | 10/2021 |
| CN | 307123783 | S | 2/2022 |
| CN | 307187974 | S | 3/2022 |
| CN | 307446605 | S | 3/2022 |
| CN | 307231888 | S | 4/2022 |
| CN | 307381847 | S | 6/2022 |
| CN | 307382238 | S | 6/2022 |
| CN | 217043051 | U | 7/2022 |
| CN | 307456884 | S | 7/2022 |
| CN | 217450601 | U | 9/2022 |
| CN | 307525222 | S | 9/2022 |
| CN | 307525223 | S | 9/2022 |
| CN | 307525224 | S | 9/2022 |
| CN | 307525228 | S | 9/2022 |
| CN | 307525229 | S | 9/2022 |
| CN | 307525230 | S | 9/2022 |
| CN | 307525231 | S | 9/2022 |
| CN | 307554049 | S | 9/2022 |
| CN | 307554055 | S | 9/2022 |
| CN | 307629829 | S | 11/2022 |
| CN | 307816807 | S | 1/2023 |
| CN | 307903137 | S | 3/2023 |
| CN | 307903138 | S | 3/2023 |
| CN | 116620706 | A | 8/2023 |
| CN | 116967040 | A | 10/2023 |
| CN | 308254869 | S | 10/2023 |
| CN | 308254870 | S | 10/2023 |
| CN | 219970514 | U | 11/2023 |
| DE | 8024829 | U1 | 8/1982 |
| DE | 3242306 | A1 | 5/1984 |
| DE | 3402097 | A1 | 8/1985 |
| DE | 3517122 | C1 | 5/1986 |
| DE | 8813520 | U1 | 12/1988 |
| DE | 8815639 | U1 | 2/1989 |
| DE | 8902223 | U1 | 4/1989 |
| DE | 3815327 | A1 | 11/1989 |
| DE | 29702206 | U1 | 3/1997 |

(56) References Cited

FOREIGN PATENT DOCUMENTS

| | | | |
|---|---|---|---|
| DE | 20202123 | U1 | 2/2003 |
| DE | 10213715 | A1 | 5/2003 |
| DE | 202004002445 | U1 | 6/2005 |
| DE | 202004002563 | U1 | 6/2005 |
| DE | 202004003116 | U1 | 7/2005 |
| DE | 202004003376 | U1 | 7/2005 |
| DE | 10 2004 003 439 | A1 | 8/2005 |
| DE | 10 2004 007 733 | A1 | 9/2005 |
| DE | 102004021298 | A1 | 11/2005 |
| DE | 202004014049 | U1 | 1/2006 |
| DE | 102006029802 | A1 | 3/2007 |
| DE | 202005020437 | U1 | 5/2007 |
| DE | 602004002475 | T2 | 6/2007 |
| DE | 102005063001 | A1 | 7/2007 |
| DE | 202006018491 | U1 | 4/2008 |
| DE | 202007001832 | U1 | 6/2008 |
| DE | 102007039106 | B4 | 2/2009 |
| DE | 202008014389 | U1 | 4/2010 |
| DE | 202009007151 | U1 | 10/2010 |
| DE | 102010012541 | A1 | 12/2010 |
| DE | 102009034715 | A1 | 1/2011 |
| DE | 102011008316 | A1 | 3/2012 |
| DE | 202014102561 | U1 | 7/2014 |
| DE | 10 2004 018 140 | A1 | 7/2015 |
| DE | 202015003663 | U1 | 9/2016 |
| DE | 102015006483 | A1 | 11/2016 |
| DE | 202017002680 | U1 | 8/2018 |
| DE | 102020109488 | A1 | 10/2021 |
| DE | 102020124381 | A1 | 3/2022 |
| EM | 000716527-0001 | | 5/2007 |
| EM | 000716527-0002 | | 5/2007 |
| EM | 000716527-0003 | | 5/2007 |
| EM | 000716527-0006 | | 5/2007 |
| EP | 1424135 | A1 | 6/2004 |
| EP | 1658143 | A2 | 5/2006 |
| EP | 1990099 | A1 | 11/2008 |
| EP | 2027931 | B1 | 2/2009 |
| EP | 2277628 | A2 | 1/2011 |
| EP | 2669213 | A1 | 12/2013 |
| EP | 2982443 | A1 | 2/2016 |
| EP | 3 053 656 | A1 | 8/2016 |
| EP | 3 078 426 | A1 | 10/2016 |
| ES | 2594332 | | 12/2016 |
| FR | 2968581 | A1 | 6/2012 |
| FR | 2982250 | A1 | 5/2013 |
| WO | 2001/40102 | A1 | 6/2001 |
| WO | 2005/018815 | A2 | 3/2005 |
| WO | 2005/070557 | A1 | 8/2005 |
| WO | 2005/077543 | A1 | 8/2005 |
| WO | 07/003245 | A1 | 1/2007 |
| WO | 2007/079188 | A2 | 7/2007 |
| WO | 2009/054986 | A1 | 4/2009 |
| WO | 2009/090273 | A1 | 7/2009 |
| WO | 2010/044864 | A1 | 4/2010 |
| WO | 2011/047876 | A2 | 4/2011 |
| WO | 2011/090857 | A1 | 7/2011 |
| WO | 2012/009284 | A2 | 1/2012 |
| WO | 2013/131626 | A1 | 9/2013 |
| WO | 2013/134182 | A1 | 9/2013 |
| WO | 2013/165556 | A1 | 11/2013 |
| WO | 2017/146993 | A1 | 8/2017 |
| WO | 2018/019412 | A1 | 2/2018 |
| WO | 2019/162397 | A1 | 8/2019 |
| WO | 20/006861 | A1 | 1/2020 |
| WO | 2021/028401 | A1 | 2/2021 |
| WO | 2021/205236 | A1 | 10/2021 |
| WO | 2022/023465 | A1 | 2/2022 |
| WO | 2022/023466 | A1 | 2/2022 |
| WO | 2022/023467 | A1 | 2/2022 |
| WO | 2022/023468 | A1 | 2/2022 |
| WO | 22/218119 | A1 | 10/2022 |
| WO | 23/035890 | A1 | 3/2023 |
| WO | 23/061205 | A1 | 4/2023 |
| WO | DM226675 | | 4/2023 |

OTHER PUBLICATIONS

KR20150065665 English Google Translation (Year: 2015).*

International Preliminary Report on Patentability dated Jan. 31, 2023, with Written Opinion, for PCT/EP2021/071254, filed Jul. 29, 2021.

International Preliminary Report on Patentability dated Jan. 31, 2023, with Written Opinion, for PCT/EP2021/071252, filed Jul. 29, 2021.

International Preliminary Report on Patentability dated Jan. 31, 2023, with Written Opinion, for PCT/EP2021/071255, filed Jul. 29, 2021.

International Search Report and Written Opinion for PCT/IB2021/000373 filed Apr. 7, 2021.

German Search Report dated Sep. 26, 2020, for German Application No. 10 2020 109 914.2.

International Search Report and Written Opinion for PCT/EP2021/71254, filed Jul. 29, 2021.

International Search Report and Written Opinion for PCT/EP2021/71252, filed Jul. 29, 2021.

International Search Report and Written Opinion for PCT/EP2021/71255, filed Jul. 29, 2021.

International Search Report and Written Opinion for PCT/EP2021/71253, filed Jul. 29, 2021.

Search Report for DE 10 2020 120 226.1, dated Dec. 22, 2020.

Search Report for DE 10 2020 120 229.6, dated Dec. 22, 2020.

Search Report for DE 10 2020 120 228.8, dated Dec. 22, 2020.

Search Report for DE 10 2020 120 231.8, dated Dec. 22, 2020.

Design U.S. Appl. No. 29/510,723: Restriction Requirement dated Nov. 3, 2015 Response filed Jan. 4, 2016 Notice of Allowance dated Jan. 27, 2016.

For U.S. Appl. No. 15/575,585: Office Action dated Jul. 18, 2018, Response filed Nov. 9, 2018 Final Rejection dated Feb. 5, 2019, Response filed Jun. 5, 2019 Notice of allowance dated Jul. 10, 2019.

For PCT/EP2016/000809: International Preliminary Report on Patentability, dated Nov. 28, 2018 Written Opinion, dated Aug. 4, 2016 International Search Report, dated Jul. 14, 2016.

English translation of Written Opinion for PCT/EP2021/059080, filed Apr. 7, 2021.

English translation of Written Opinion for PCT/IB2021/000373 filed Apr. 7, 2021.

International Search Report and Written Opinion for PCT/EP2021/059080, filed Apr. 7, 2021.

German Search Report dated Sep. 18, 2020 for Application No. 10 2020 109 913.4 (English trans).

* cited by examiner

PAINT CUP MADE OF NATURAL FIBROUS MATERIAL

FIELD OF THE INVENTION

The invention relates to a paint cup for a paint spray gun.

BACKGROUND

Paint cups for paint spray guns have a usually closable container for paint, which can be coupled to a paint spray gun via a paint discharge opening, thus enabling paint to flow out of the paint cup into the paint spray gun (paint flow cup), where the paint is atomized by means of compressed air. Such paint cups are manufactured from plastic. A paint cup having a lid system closing an opening is known from EP 1 424 135 B1, for example.

Given the increasing scarcity of resources worldwide, alternative materials made from sustainable raw materials are also becoming significant in the field of paint cups, the previous paint cups and lid systems lacking sufficient inherent stability or sufficient security against leakage in the rough workshop environment for combination with these materials.

SUMMARY

One aspect of the invention relates to a paint cup for a paint spray gun having sufficient leaktightness.

According to the invention, a paint cup for a paint spray gun has an opening which can be closed by a lid which closes the opening. In this case, a coupling section of the vessel wall is clamped in a liquid-tight manner between a first and a second clamping surface of a lid system comprising the lid, wherein the vessel wall is made of a natural fibrous material.

The frictional clamping of the vessel wall makes it possible, inter alia, to use even low-strength materials made of natural fibrous material or plant-based materials. Natural fibrous material or plant-based materials are to be understood to mean materials such as paper, cardboard, hard paper, paperboard, corrugated cardboard or even composite materials which contain one of the abovementioned material plies. In particular, they involve a cellulose-based fibrous material. The natural fibrous material is embodied, for example, as a paper material which is produced from mechanical pulp, chemical pulp, semichemical pulp or waste paper by bonding or pressing together.

Further advantageous developments and features are also disclosed herein.

The vessel wall can extend in relation to a longitudinal axis and can be of substantially rotationally symmetrical design, wherein the coupling section is advantageously clamped radially and/or axially between the first and the second clamping surface. By means of the expediently designed clamping, it is possible to achieve a liquid-tight connection of the lid system and the paint container on different material bases and/or material pairs.

In one expedient embodiment, the coupling section is designed as a substantially axial end section of the vessel wall. Alternatively, the coupling section can also be designed as a projecting annular collar pointing radially outward from the vessel wall.

Advantageously, the lid system can comprise the lid and a counter-ring, wherein the axial end section is clamped radially between the lid and the counter-ring. Such an embodiment has the advantage that the vessel wall is subject to no or only slight adaptations and the axial end section can be adapted in an uncomplicated manner in or to existing production techniques. The lid system can be reusable and can be produced from a conventional inorganic plastic, for example.

The counter-ring can be pushed or placed detachably onto the paint container. Alternatively, the counter-ring can be rigidly connected to the vessel wall. For this purpose, the counter-ring can be molded directly onto the paint container in an injection molding process, can be fused as an individual part to a plastic surface of the paint container, or can be adhesively bonded to the paint container. The connection between the counter-ring and the paint container is preferably designed to be liquid-tight.

A particularly material-saving variant is obtained in that, instead of a continuous encircling counter-ring, only threaded segments are formed on the paint container, preferably by injection molding plastic, which can interact with a thread on a lid designed as a screw cap.

However, the counter-ring, which is in the form of a plastic rim, can have virtually all known connection systems between it and the lid, such as screw, latching or snap-action connections. For example, it can have a threaded edge which interacts with a lid designed as a screw cap. Alternatively, it can have a snap-on edge which interacts with latching tabs on a lid embodied as a snap-on lid.

Irrespective of whether a coupling section of the vessel wall is arranged in a liquid-tight manner between a first and a second clamping surface of a lid system comprising the lid, a paint cup comprising a paint container with a vessel wall which is made of a natural fibrous material, in particular a cellulose-based fibrous material, is considered to be inventive, wherein a counter-ring, preferably made of plastic, is fixedly attached to the vessel wall and/or threaded segments are molded on.

As a particular preference, the lid and the counter-ring can each have paired threads for screw fastening to one another. As a result, high contact pressures can be achieved on the clamping surfaces, which are largely independent of the material properties of the vessel wall.

In order to achieve reliable clamping, the counter-ring can be configured with a first, handling section and a second, functional section arranged (axially) above it. The functional section itself can comprise an external threaded section with a thread. The functional section can at the same time comprise on its radially inner surface a preferably conically designed sealing section with the first clamping surface. Furthermore, the lid can comprise a lid section and a hollow collar on the outer circumference. The hollow collar expediently has a radially inner and a radially outer collar for receiving the counter-ring, wherein the outer collar has a threaded section, which is counter-paired with the threaded section, and the inner collar has the second clamping surface, which is preferably of conical or cone-shaped design. In particular, a preferably wedge-shaped receptacle for the sealing section of the counter-ring and the coupling section on the paint container is formed between the inner and outer collars. When the first and second threaded sections are screwed together, the coupling section of the vessel wall can be clamped radially between the first and second clamping surfaces. A thickened portion or a sealing bead at the end of the paint container is thus unnecessary.

In order to additionally secure the vessel wall against slipping out, the axial end section of the vessel wall can extend in a conically opening or, alternatively, closing manner. As a result, the holding or clamping forces of the vessel wall can be increased without having to increase the forces actually present, for example in a threaded connection. This makes it more difficult for the vessel wall to slip out or to be pulled out of the hollow collar.

In no less advantageous but alternative embodiments, the counter-ring can be designed as a snap ring. The snap ring preferably has an annular groove. The lid and an annular collar of the vessel wall are, for example, elastically clamped in the annular groove. In other words, the lid and the annular collar of the vessel wall are pressed together in a sealing manner by the snap ring. Although an annular collar requires additional production steps for the vessel wall or the coupling section of the vessel wall, it is nevertheless possible in this way, for example, to achieve a lid system without complex threads.

Advantageously, the annular collar can be embodied as a hollow or non-hollow sealing bead. A sealing bead is to be understood to mean a local thickening of the vessel wall at its end facing the opening. Such a sealing bead advantageously makes it possible to set and vary elasticity coefficients of the coupling section, thereby enabling the leaktightness of the connection between the lid system and the vessel wall to be influenced and increased. In particular, the sealing bead can be produced with a circular or oval cross section, thereby making it possible to achieve high coefficients of elasticity.

In a further, alternative, but no less expedient embodiment, the lid can have an annular rim and the lid system can have at least two closure parts, which are arranged radially opposite the annular rim and are movably connected to the lid via a hinge. This makes it possible to produce the lid system substantially in one piece. A one-piece lid system also simplifies handling.

In an advantageous development, the lid additionally has an annular collar. In this case, the first clamping surface can expediently be arranged on the annular collar of the lid and the second clamping surface can be arranged on the closure parts, wherein the first and second clamping surfaces are preferably each of concave design. By means of a concave configuration, secure accommodation, for example of a sealing bead, is provided, it being possible for the frictional connection to be supplemented by a positive/nonpositive force component.

In all embodiments, an additional sealing means can advantageously be arranged between the first and the second clamping surface. The sealing means can, for example, take the form of an O-ring. An additional sealing means provides greater freedom of choice with respect to available materials for the lid system and/or vessel wall without adversely affecting the sealing properties.

In a particularly preferred exemplary embodiment, the paint container has a base, which closes the vessel wall at least on one side and is preferably produced from a natural fibrous material, in particular from a cellulose-based fibrous material.

A variant of the invention in which the vessel wall and/or the base are/is made of cardboard is particularly advantageous. Cardboard is considered to be a sheet material made of plant-based/natural fibrous material and having a weight per square meter of more than 200 $g/m^2$.

For the use of the paint cup according to the invention in a paint environment, it is of particular advantage if the vessel wall and/or the base are provided, at least on the inside, with a liquid-resistant, preferably solvent-tight coating, in particular of plastic and/or aluminum.

In all embodiments, the vessel wall or, if appropriate, the base can be produced in single-ply, two-ply or three-ply form. In particular, it is conceivable and possible to produce the vessel wall as single- or double-laminated cardboard. By means of a higher ply density, the inherent stability of the vessel wall and thus of the paint cup can be influenced in an advantageous way, thereby also making it possible to increase the service life of the paint cups, e.g. for repeated use.

Furthermore, the paint cup can have an ascending or descending filling level indicator and/or mixing scale on the inside or outside. The filling level indicator or the mixing scale is preferably printed onto the fibrous material.

Parts of the paint cup can preferably be of transparent and/or opaque design. This enables a filling level and/or the correct connection of the paint container and lid system also to be checked visually in all cases. For example, the paint container, the counter-ring, the snap ring and/or the lid can be of transparent design. Transparent plastics and/or cellulose, e.g. transparent paper, are known.

The lid can have a paint outlet opening for connection to the paint spray gun. As an alternative, it is also possible for the paint outlet opening to be integrated not into the lid system but into the vessel wall of the paint cup. It is possible, for example, for the vessel wall to merge into a frustoconical, e.g. conical-section-shaped, base of the paint cup, the paint cup thus being produced substantially in one piece, apart from the lid system. The base can optionally have an interface for connection to the paint spray gun or for connection to an adapter for connection to the paint spray gun. As a result, the need for parts and thus the variety of variants are reduced.

Furthermore, a valve for atmospheric pressure equalization between the inner volume of the paint cup and the atmosphere is expediently provided on the lid or on the base, this being particularly expediently designed as a piercing spike for penetrating through the wall of the paint container, in particular of a base of the paint container.

In a method according to the invention for sealing a paint cup, during the sealing connection of the lid and vessel wall, the vessel wall or its coupling section is clamped radially and/or axially, ensuring that stability properties of the vessel wall play only a subordinate role. As a result, there is new latitude for alternative materials.

BRIEF DESCRIPTION OF THE DRAWINGS

Advantageous embodiments and further features of the invention will be found in the figures and the following description of the figures. Here, identical or at least comparable features are denoted by the same reference signs.

More specifically.

DETAILED DESCRIPTION

Figure 1:
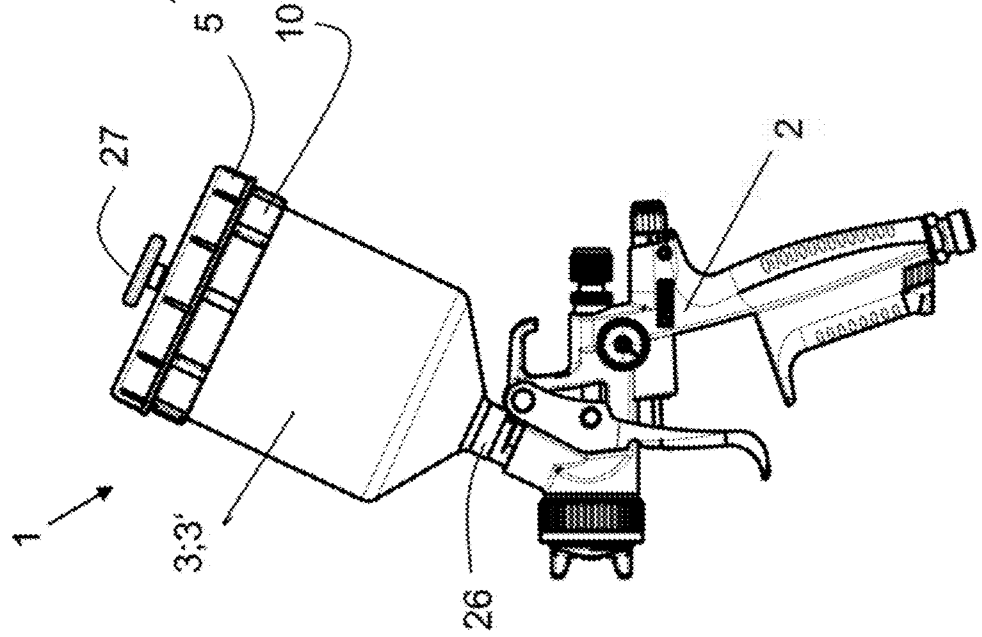
FIGS. 1 to 3 show a paint cup according to the invention with a paint spray gun in an embodiment as a conventional paint flow cup in a side, a front and a sectional view with an opening closed by a lid.
Figure 2:
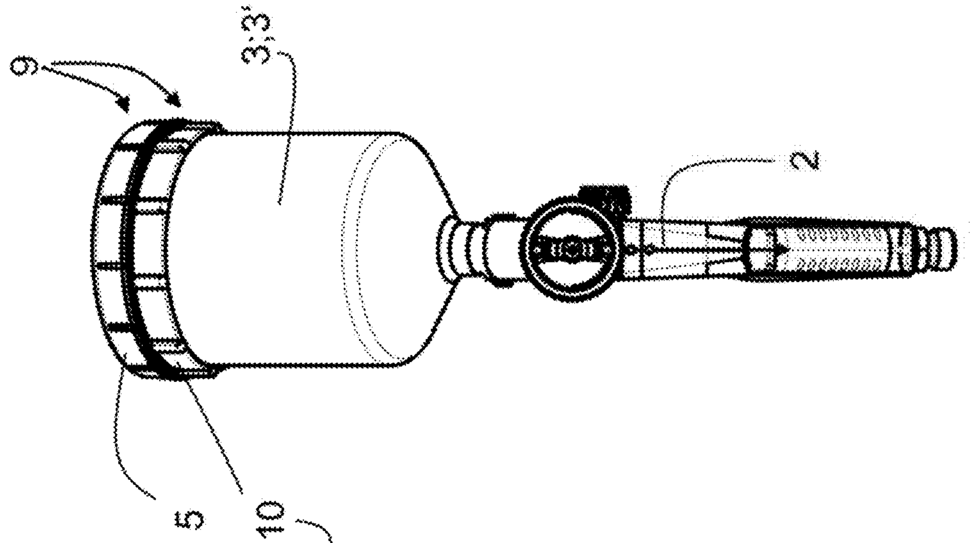
Figure 3:
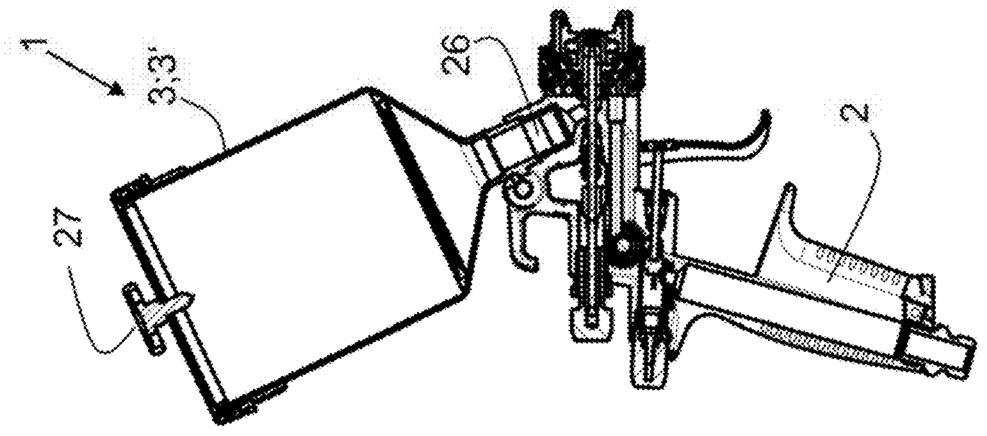

FIGS. 1 to 3 show paint cup 1 with the lid 5 and the paint container 3. In this case, the paint container 3 forms an outer, here slightly conical vessel wall, adjoining the underside of which is a funnel-shaped extension with an outlet opening 26 for paint. The outlet opening 26 is detachably connected to the paint spray gun 2 via a corresponding connection. Due to gravity, paint in the paint container 3 flows into the paint spray gun 2 and remains there until it is taken along and atomized by a compressed air flow provided by the paint spray gun 2.

Here, the entire paint container 3 is manufactured from an organic material. This can be single-ply or multi-ply cellulose (paper, cardboard). The paint container 3 can be of single-part or multi-part construction, in particular can be constructed from a plurality of sections which are laminated or pressed together. In the exemplary embodiment of FIGS. 1 to 3, the paint container 3 is formed with two plies, but integrally, i.e. without sections subsequently connected to one another. The paint cup 1 can be manufactured, for example, from a blank which is rolled to form a hollow body and laminated at the connecting edge. In addition, at least on the inside, it has a liquid-resistant coating, in particular of an organic, biodegradable plastic.

Figures 4, 5, 6:
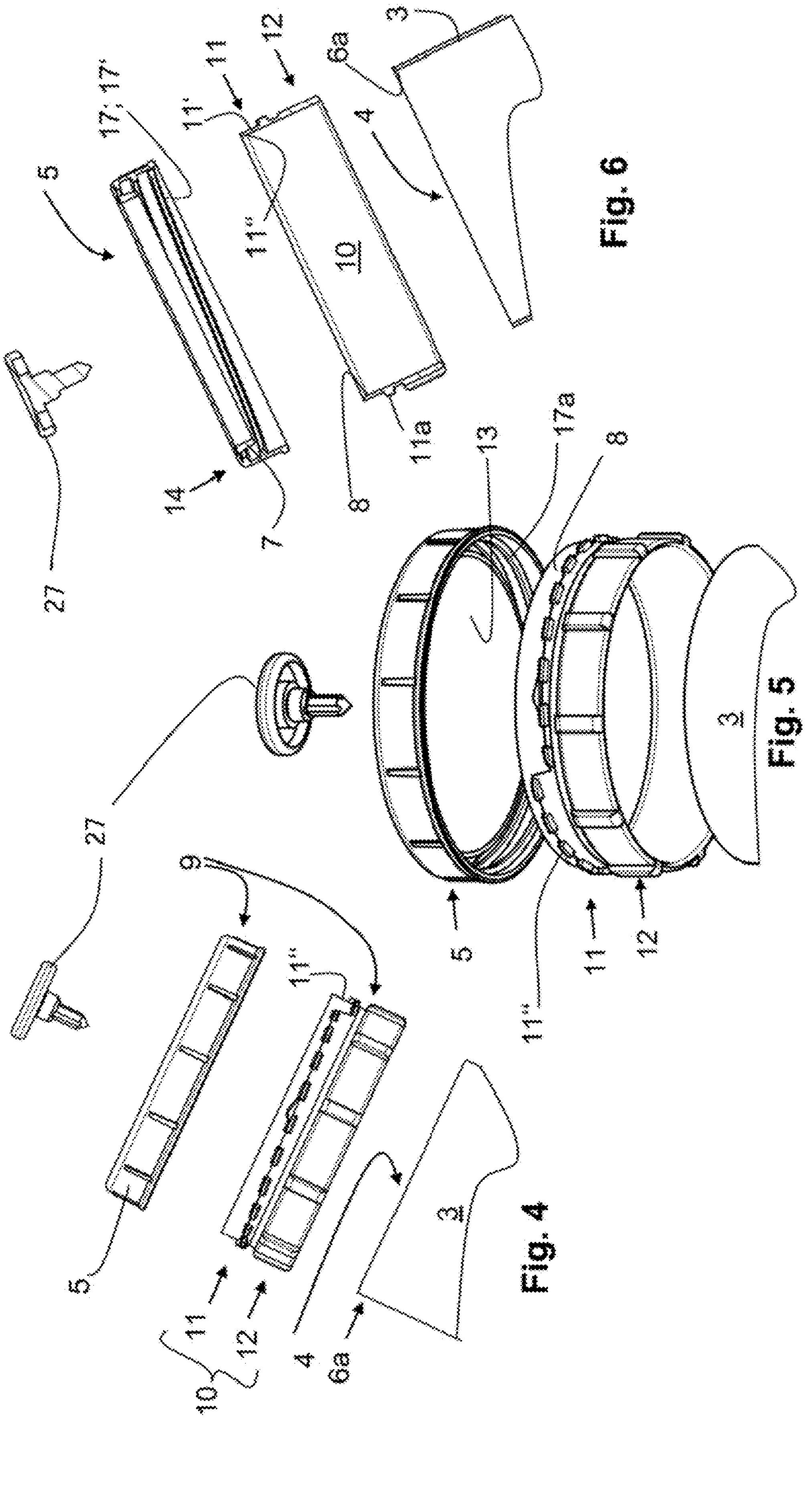
FIGS. 4 to 6 show detail views of the lid system from FIGS. 1 to 3 in a side view, front view and a sectional view in an exploded illustration.

On the upper side, for example on the side facing away from the paint spray gun 2, the paint cup 1 has an opening 4 configured as a refill opening, see FIG. 4, via which paint can be replenished at any time even when the paint cup 1 is mounted on the paint spray gun 2. The refill opening 4 is formed by a coupling section 6*a* of the vessel wall 3', said coupling section being described in more detail below. The opening 4 is closed by means of a lid system 9 with a lid 5 and a counter-ring 10. The lid 5 comprises a lid section 13, which is pierced by a piercing spike 27 in the depictions of FIGS. 1 to 3. The piercing spike 27 represents an atmospheric connection between the interior of the container of the paint cup 1 and the environment by means which are not described in detail.

Figure 7:
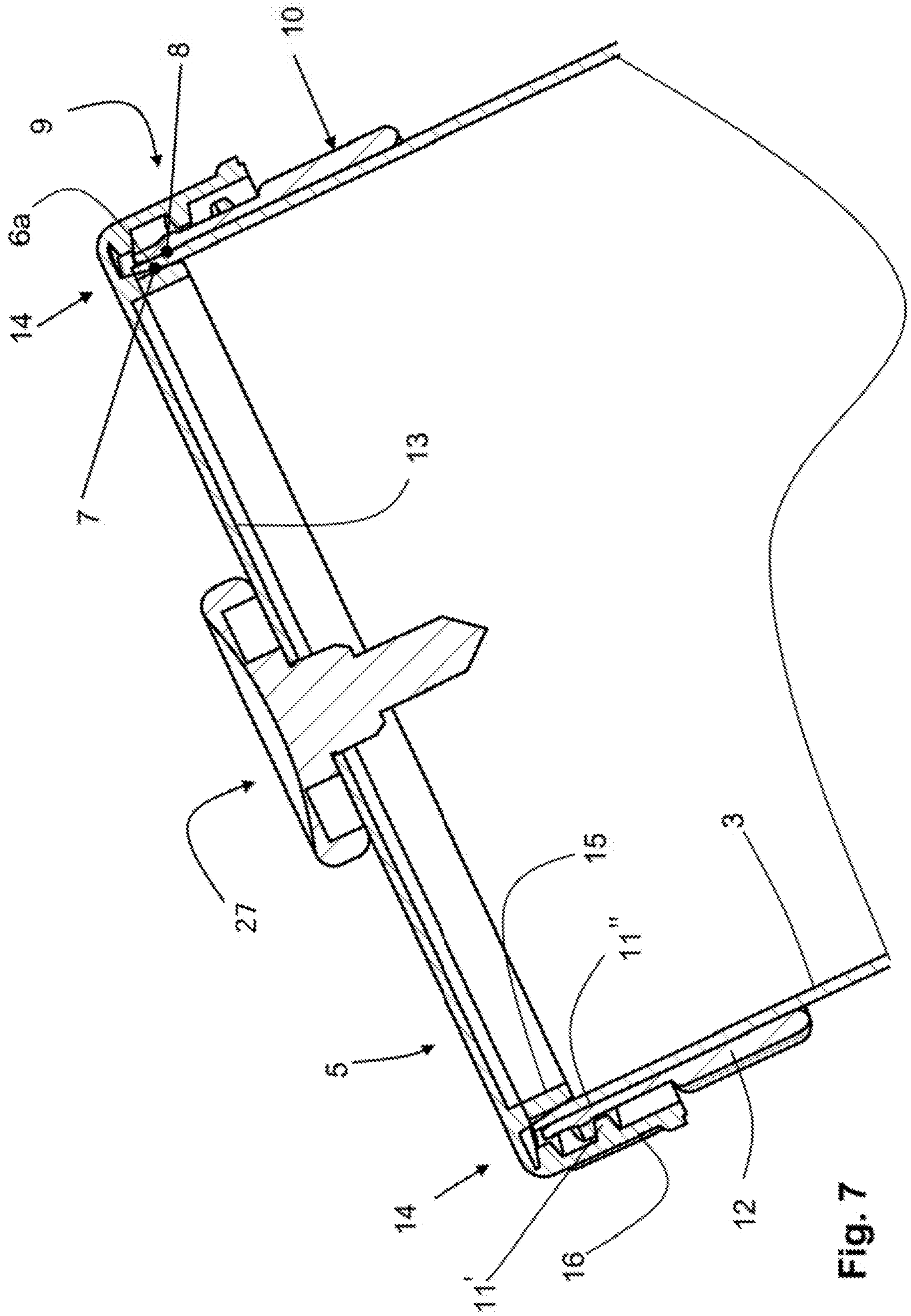
FIG. 7 shows a detail view of the lid system in the state connected to the paint container.

FIGS. 4 to 6 illustrate segments of the paint cup 1 of FIGS. 1 to 3 in an exploded illustration; FIG. 7 illustrates the paint cup 1 with the lid system 9 mounted. The structure of the lid system 9 is described in more detail with reference to FIGS. 4 to 7:

As already described, the lid 5 comprises a lid section 13, which is adjoined circumferentially and substantially perpendicularly to the lid section 13 by a hollow collar 14, which consists of the cylinder collars 15 and 16. Here, the outer cylindrical collar 16 extends further in the axial direction than the inner cylindrical collar 15. A threaded section 17 with a noncontinuous thread 17*a* is formed on the inner circumference of the outer cylindrical collar 16. A sealing section 11' with the clamping surface 7 is formed on the outer circumference of the inner cylindrical collar 15. As can be seen, in particular, from FIG. 7, a wedge-shaped receptacle 11' for the sealing section 11' and the coupling section 6*a* is formed between the collars 15, 16. The outer circumferential side of cylindrical collar 16 is provided with gripping aids, which are intended to facilitate rotation of the lid 5.

The hollow collar 14 serves to receive the counter-ring 10 and the coupling section 6*a* of the paint container 3 clamped therebetween under stress.

The counter-ring 10 is of circular-cylindrical or slightly conical design and, as seen in the axial direction, comprises a lower handling section 12 with external gripping depressions and a functional section 11 arranged thereabove. The functional section 11 comprises on the outside a threaded section 11' with a noncontinuous external thread 11*a*. The sealing section 11" with the second clamping surface 8 is formed on the inner circumference of the functional section 11, that is to say radially on the inside.

A coupling section 6 in the form of an extended vessel wall 6*a* or an axial end section is formed on the substantially circular-cylindrical vessel wall 3' of the paint container 3 of the paint cup 1. The coupling section 6 can be identical in construction to the remainder of the vessel wall 3' or, for example, can also have a socket.

For the sealing connection of the lid system 9 and the paint container 3, the counter-ring 10 is pushed from below onto the outside of the vessel wall 3', while the lid 5 is placed from above on the vessel wall 3' with the coupling section 6*a*. The counter-ring 10 or its threaded section 11' is now brought into abutment with the threaded section 17 of the cylindrical collar 16 and screwed thereto. In this case, the coupling section 6*a* is located between the outer circumferential side of the inner cylindrical collar 15 of the lid 5 and the inner circumferential side of threaded section 11' of the counter-ring 10. The aforementioned outer and inner circumferential sides form the clamping surfaces 7 and 8, respectively, between which the coupling section 6*a* is clamped. The clamping is effected by the axial movement of the threaded section 11', which is produced during the screwing operation, into the gap formed by the hollow collar 14, which gap becomes increasingly narrower when viewed axially owing to the wedge shape of the cylindrical collar 16. As a result, the coupling section 6*a* is clamped in a radially sealing manner. In the screwed state, it is also impossible for the paint container 3 to be removed from the lid system 9 because of the frictional forces. A lid system 9 of this type is also suitable, in particular, for paint containers 3 having a very thin wall, in which radial clamping is easy to achieve.

In an exemplary embodiment (not shown), it is also possible for the counter-ring 10 to be rigidly connected to the vessel wall 3'. For this purpose, the counter-ring 10 can be molded directly onto the paint container 3 in an injection molding process, can be fused as an individual part to a plastic surface of the paint container 3, or can be adhesively bonded to the paint container 3. The connection between the counter-ring 10 and the paint container 3 is preferably designed to be liquid-tight in this variant (not shown).

Since the actual connection is not visible from the outside and the risk of misuse cannot be ruled out, the counter-ring 10 and/or the lid 5 are/is of transparent or at least opaque design. To enable correct connection to be ascertained, the coupling section 6*a* is also advantageously clearly distinguished in terms of color from the remainder of the vessel wall 3', for example by means of a circumferential marking. The marking preferably also has friction-enhancing properties. Alternatively or in addition, the coupling section 6*a* can also be provided with a finish or other coating which enhances friction and/or sealing.

Figure 12:
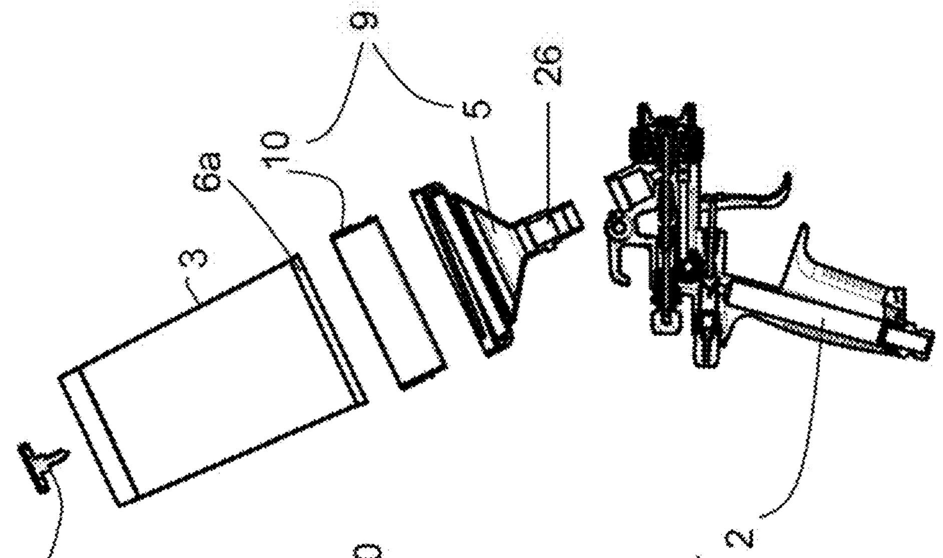
FIGS. 10 to 12 show a paint cup according to the invention with a paint spray gun in an embodiment as an upside-down variant in a side, a front and a sectional view.
Figure 11:
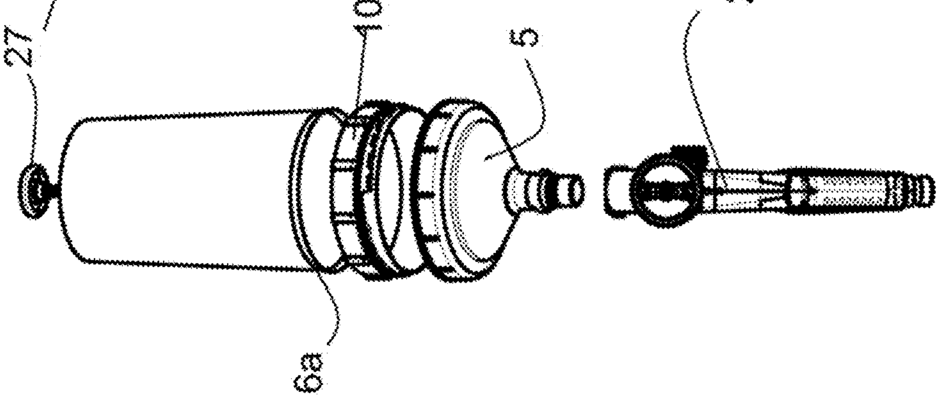
Figure 10:
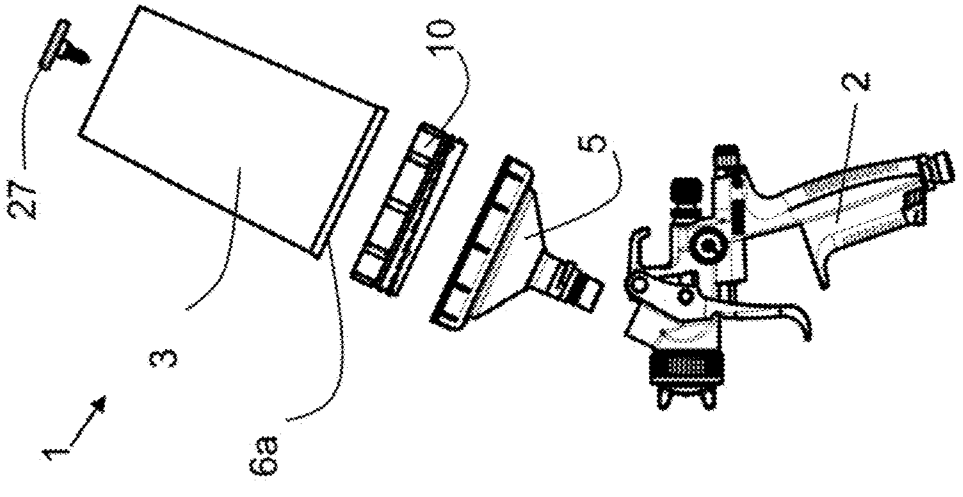

In a modified embodiment of the abovementioned exemplary embodiment according to FIGS. 10 to 12, the paint cup 1 can also be embodied as an upside-down variant. For this purpose, the lid 5 is funnel-shaped and provided with an outlet opening. The lid system 9 is otherwise unchanged. The paint container 3 differs inasmuch as it now has a flat base 28 which can be pierced by the piercing spike 27. Furthermore, although the coupling section 6*a* of the paint container 3 is designed as an end section of the remainder of the vessel wall 3' and, in particular, without a thickened portion or annular collar on the vessel wall 3', it can have an opening angle which is different from that of the vessel wall 3'. Here, the coupling section 6*a* of the exemplary embodiment is designed to open in the shape of a cone with a larger opening angle than the cone-section-shaped vessel wall 3' of the paint container 3. As a result, clamping forces can be increased and leaktightness can be improved.

Figure 9A:
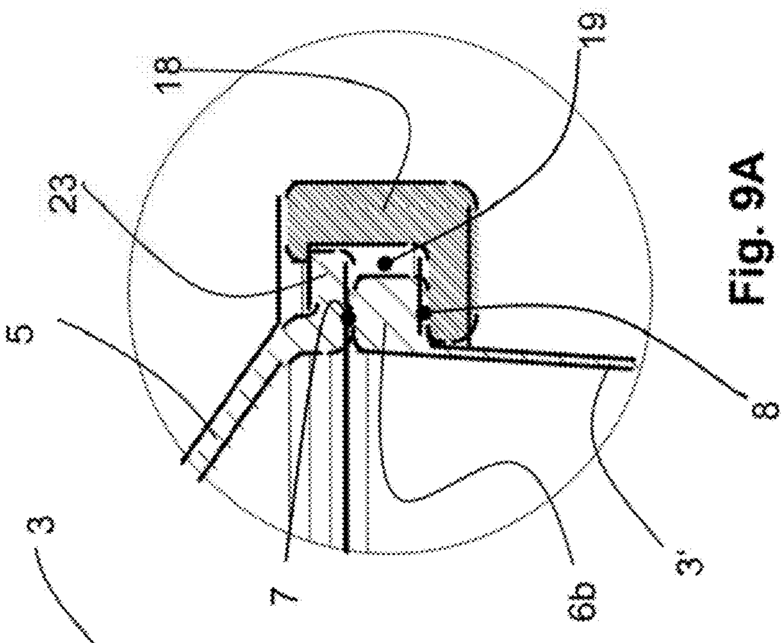
FIG. 9A shows a detail from FIG. 9 in an enlarged illustration.
Figure 9:
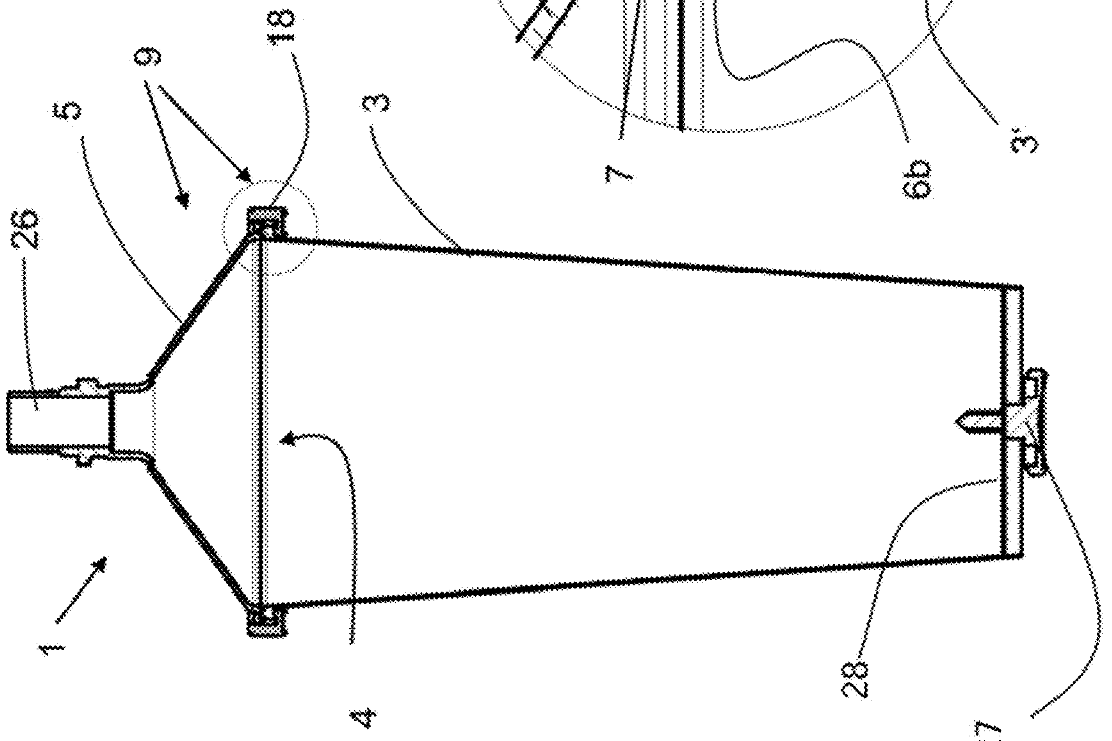
FIGS. 8 and 9 show a paint cup according to the invention with a lid system comprising a snap ring in a frontal and a sectional view.
Figure 8:
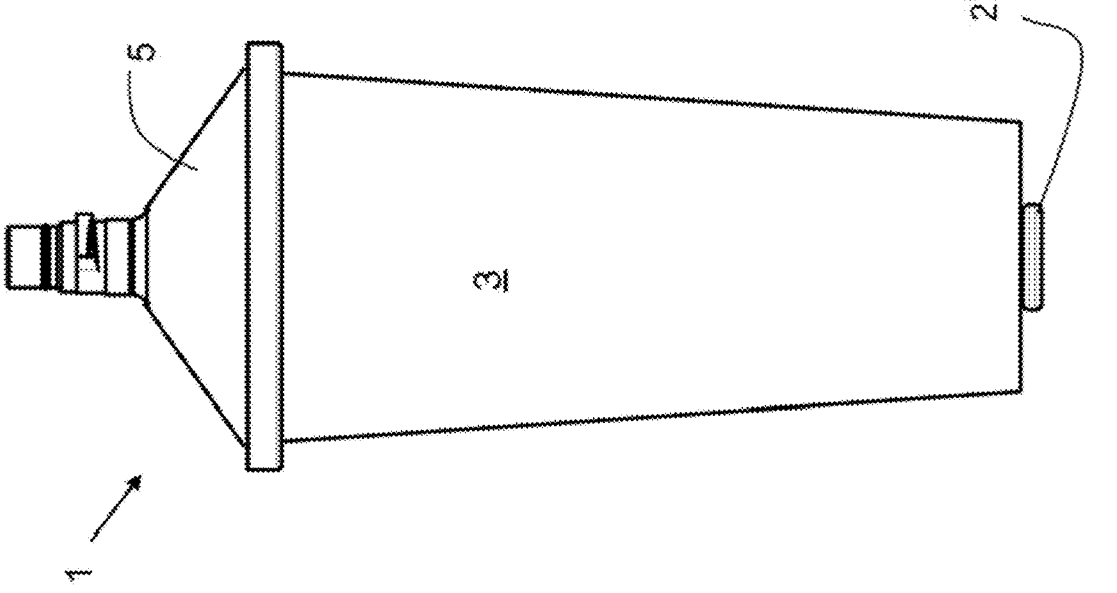

FIGS. 8 to 9A illustrate an alternative embodiment of the paint cup 1, which, as above, comprises a paint container 3 and a lid system 9. Here, as for all the figures, identical or at least comparable features bear the same reference signs, and therefore repeated explanation is avoided for the sake of brevity. Here, in contrast to the preceding exemplary embodiment, the coupling section 6 of the paint container 3 is produced as a radial annular collar 6*b*, which can be produced, for example, by upsetting or rolling a part of the vessel wall 3'. Axially at the top and bottom, the annular collar 6*b* forms respective annular surfaces, not shown in detail in the figures, which are clamped between the annular clamping surface 7 of the lid 5 and the annular clamping surface 8 of the snap ring 18. Clamping surface 7 is formed on the annular collar 23 of the lid 5, which, extending radially outward, adjoins the funnel-shaped basic shape of said lid.

Annular collar 23 and annular collar 6*b* are enclosed in the annular groove 19 by the snap ring 18, which as a result is C-shaped in cross section.

For assembly, the snap ring 18 is guided axially from below up to the annular collar 6*b* of the paint container 3 and then the lid 5 is placed on from above with its annular collar 23 and latched into the snap ring 18 as the latter yields. For easier insertion, respective insertion bevels are advantageously provided on the annular collar 23 and on the upper leg of the snap ring 18, as can be seen from FIG. 9A.

As a result of the latching connection, the annular collar 6*b* is axially clamped. The embodiment of this type has the advantage that correct closure of the paint container 3 with the lid 5 can be perceived visually and audibly. Nevertheless, it may be advantageous to design the snap ring 18 to be transparent or at least opaque in order, for example, to detect wetting of the collar 6*b* and the associated risk of tearing off at an early stage. The possibility of additional advantageous coatings on the annular collar 6*b* to enhance leaktightness, elasticity or other properties can also be implemented.

Figure 13:
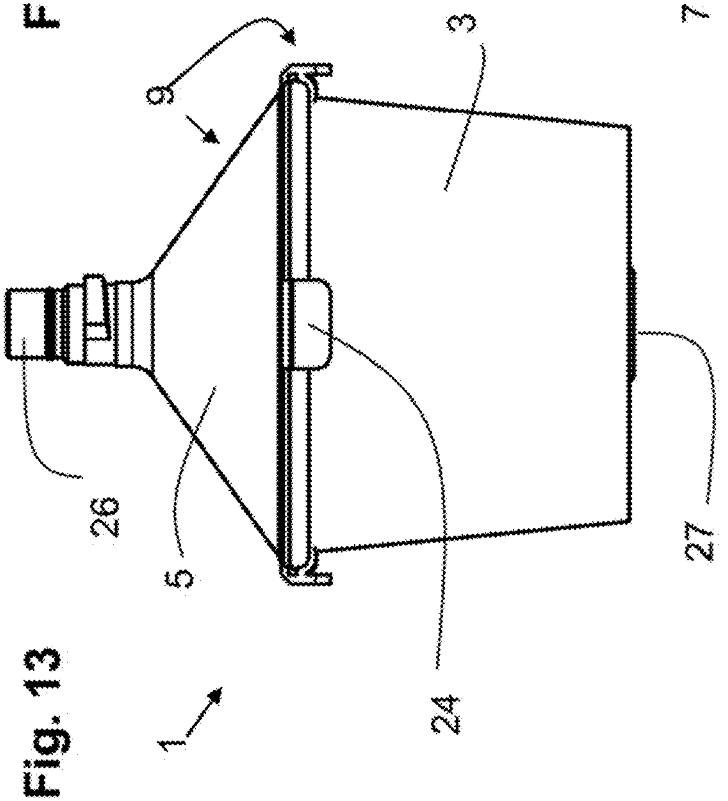
FIGS. 13 and 14 show a further embodiment variant of a paint cup according to the invention in a front and a sectional view.
Figure 14:
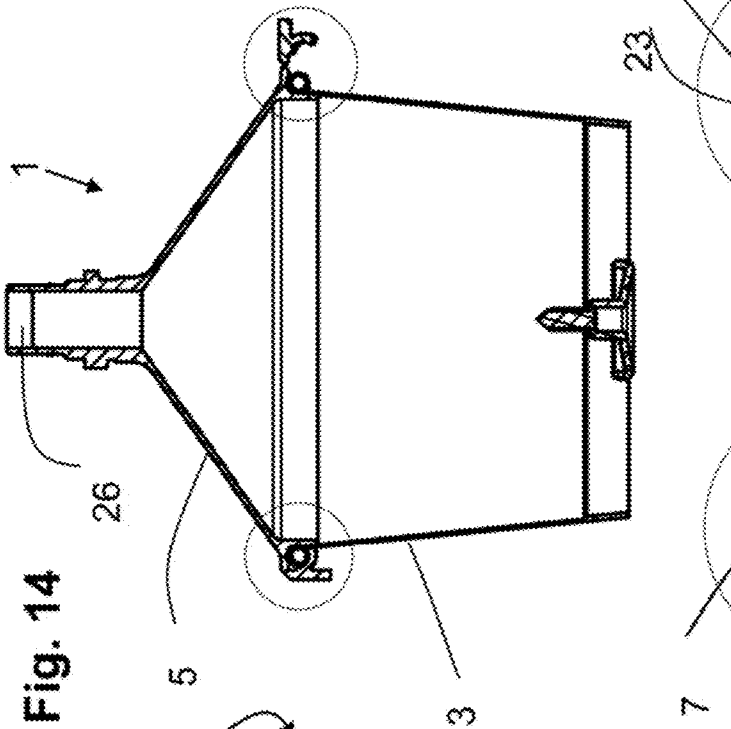
Figure 14A:
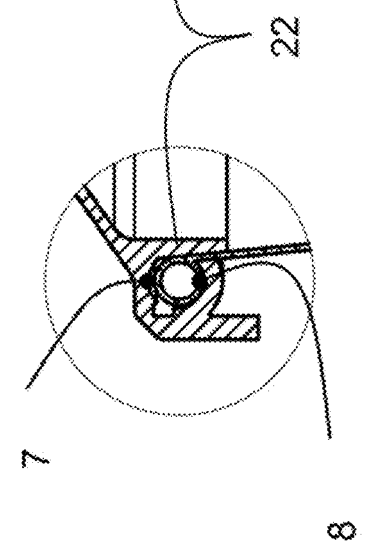
FIGS. 14A and 14B show details from FIG. 14 in an enlarged illustration.
Figure 14B:
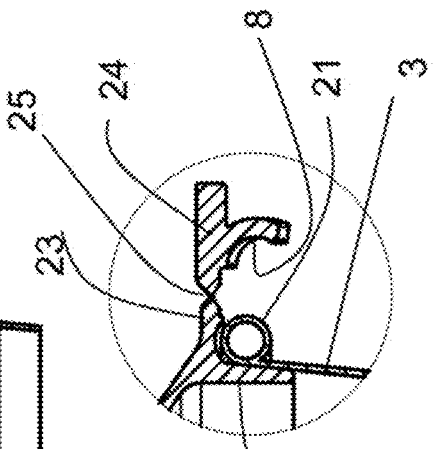

A further exemplary embodiment of a paint cup 1 with a click closure is now described with reference to FIGS. 13 to 14B: The paint container 3 depicted there is closed by a lid system 9, wherein, in contrast to previous exemplary embodiments, the lid system 9 is constructed from a funnel-shaped lid 5 with a radially projecting annular collar 23 and an axially projecting, cylindrically designed annular rim 22. Connected to the annular collar 23 are four fastening elements 24, which are connected in an articulated manner by hinges 25 and can be moved from an open position (FIG. 14A) into a closed position (FIG. 14B). The coupling section 6*b* of the paint container 3, which is embodied as an annular collar 23, is designed here as a hollow, approximately annular sealing bead 21, and this has an advantageous effect on the squeezability of the coupling section 6.

When the lid 5 is put in place, the sealing bead 21 comes into contact with the concave clamping surface 7 of the annular collar 23. Here, the clamping surface 7 is formed as an arcuate and encircling groove in the annular collar 23. The second clamping surface 8, which is situated on the fastening element 24, is likewise of concave design. Clamping takes place in that the fastening element or elements 24 are articulated in such a way that the force ratios move to a minimum potential when the fastening element or elements 24 is or are moved. An embodiment of this type has the advantage that secure and at least substantially liquid-tight connection of the lid system 9 and the paint container 3 is already present after two fastening elements 24 have been closed.

It is also conceivable, for example, for some other vegetable pulp, such as, for example, a corn starch-based material, to be used instead of natural fibrous material.

In alternative embodiments (not shown), a different embodiment can be used instead of the ventilation valve formed by the piercing spike 27. The following may be mentioned as examples:

- a paper or foil tab for tearing open and re-closing a previously introduced ventilation opening in the base of the cup,
- a threaded piercing spike, which can be screwed into a screw-in region of the base of the cup, the screw-in region optionally being reinforced by an additional layer of cardboard; the opening introduced by the spike can possibly also be (re-) closed by means of some other screw-in closure element;
- a valve attached or inserted, e.g. fixed by means of an adhesive or welded connection; can be actuated manually: plug-in, pivoting, rotary, rocker valve; opens automatically due to reduced pressure in the interior: duck-bill valve, honey valve, diaphragm valve);
- a valve assembly with a unscrewable cap, wherein the cap has a cutting edge which, as the cap is unscrewed, cuts the base or a closure foil in a previously introduced ventilation opening in the base of the cup.

The paint cups 1 preferably have a screen element, which is arranged in the interior of the paint cup 1 in such a way that the paint has to flow through the screen element before it can leave the paint cup 1 via the paint outlet opening 26. As a particular preference, the screen element is produced at least partially from hard paper or paperboard in order to avoid plastic material in the disposable article and to allow a simplified production method with advantageous tools.

Figure 15:
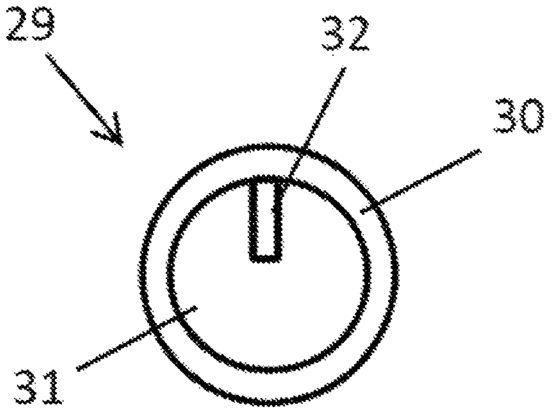
FIG. 15 shows a disk-shaped screen element in a plan view.

FIG. 15 shows, by way of example, a disk-shaped flat screen element 29 in a plan view. It comprises a hard paper ring 30 (e.g. punched out of the paint container material) and a plastic screen fabric 31, which is fused to a plastic coating of the hard paper ring 30. The hard paper ring 30 is also provided with a handling tab 32.

Figure 16:
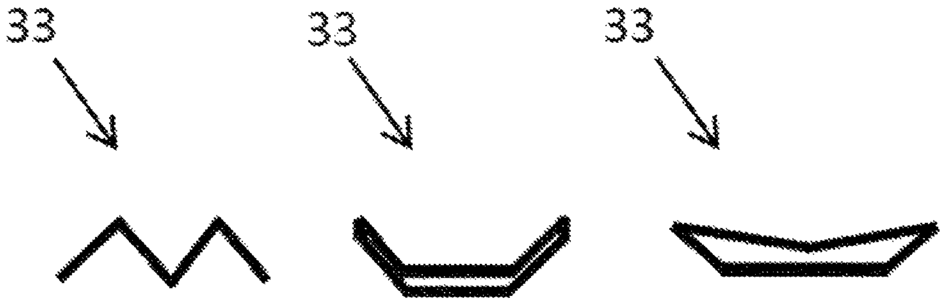
FIG. 16 shows various cross-sectional shapes of a back bar.

FIG. 16 illustrates, by way of example, the cross sections of three variants of an elongate stirring rod 33 made of coated hard paper or paperboard. By means of the folded profile shapes, the stirring rods 33 become stable. In addition, the profile, such as the seam in the case of paint containers 3, can be welded. The cross-sectional shape can also vary over the length of the stirring rod, leading to the formation of a gripping surface, for example.

The invention claimed is:

1. A paint cup configured for use with a paint spray gun, the paint cup comprising a paint container having an opening, a container wall made of a natural fibrous material, and a lid system configured for closing the opening, the lid system including a lid and a counter-ring configured for engaging the lid, wherein a coupling section of the container wall is arranged in a liquid-tight seal between a first and a second clamping surface of the lid system, wherein the coupling section is clamped at least one of axially and radially between the lid and the counter-ring, wherein the counter-ring includes a handling section and a functional section arranged axially above the handling section, wherein the functional section includes an outer circumference having a threaded section, wherein the lid includes a lid section having a hollow collar around an outer circumference thereof configured for receiving the counter-ring, and wherein an outer surface of the hollow collar has a threaded section configured for engaging with the threaded section of the outer circumference of the functional section and the coupling section is clamped between the first and second clamping surfaces when the threaded section of the outer circumference of the functional section is engaged with the threaded section of the outer surface of the hollow collar.

2. The paint cup as claimed in claim 1, wherein the container wall extends in relation to a longitudinal axis of the paint container and has a substantially rotationally symmetrical design.

3. The paint cup as claimed in claim 1, wherein the coupling section is a substantially axial end section of the container wall having a conical opening or is a radially projecting annular collar configured as a hollow or non-hollow sealing bead.

4. The paint cup as claimed in claim 1, wherein the counter-ring is configured as a snap ring having an annular groove.

5. The paint cup as claimed in claim 4, wherein the lid and the coupling section of the container wall are elastically clamped in the annular groove.

6. The paint cup as claimed in claim 1, wherein the paint container further comprises a base made of a natural fibrous material, which is configured to close the container wall at least on one side.

7. The paint cup as claimed in claim 6, wherein at least one of the container wall and the base is made of cardboard with a weight per square meter of more than 200 $g/m^2$.

8. The paint cup as claimed in claim 6, wherein at least one of the container wall and the base has a liquid-resistant coating on at least one of an inside surface and an outside surface.

9. The paint cup as claimed in claim 8, wherein the liquid-resistant coating is at least one of plastic and aluminum.

10. The paint cup as claimed in claim 6, wherein at least one of the container wall and the base is produced in single-ply, two-ply, or three-ply form.

11. The paint cup as claimed in claim 10, wherein at least one of the container wall and the base is produced as single-laminated or double-laminated cardboard.

12. The paint cup as claimed in claim 1, wherein at least a portion of the paint cup is transparent to allow visual checking of the connection of the paint container and lid system.

13. The paint cup as claimed in claim 1, wherein the natural fibrous material is a cellulose-based fibrous material.

14. A method for sealing closure of the paint cup as claimed in claim 1, the method comprising clamping the coupling section at least one of radially and axially between the lid and the counter-ring during sealing connection of the lid and the container wall.

15. A paint cup configured for use with a paint spray gun, the paint cup comprising a paint container having an opening, a container wall made of a natural fibrous material, and a lid system configured for closing the opening, the lid system including a lid and a counter-ring configured for engaging the lid, wherein a coupling section of the container wall is arranged in a liquid-tight seal between a first and a second clamping surface of the lid system, wherein the coupling section is clamped at least one of axially and radially between the lid and the counter-ring, wherein the counter-ring includes a handling section and a functional section arranged axially above the handling section, wherein the functional section includes an outer circumference having a threaded section and an inner circumference having a sealing section configured as the first clamping surface, wherein the lid includes a lid section having a hollow collar around an outer circumference thereof configured for receiving the counter-ring, and wherein an outer surface of the hollow collar has a threaded section configured for engaging with the threaded section of the outer circumference of the functional section and an inner section of the hollow collar is configured as the second clamping surface such that the coupling section is clamped between the first and second clamping surfaces when the threaded section of the outer circumference of the functional section is engaged with the threaded section of the outer surface of the hollow collar.

* * * * *